Oct. 9, 1951 G. DEAKIN 2,570,214
SECOND TEST CIRCUIT FOR SELECTOR WIPERS
Filed Sept. 14, 1946
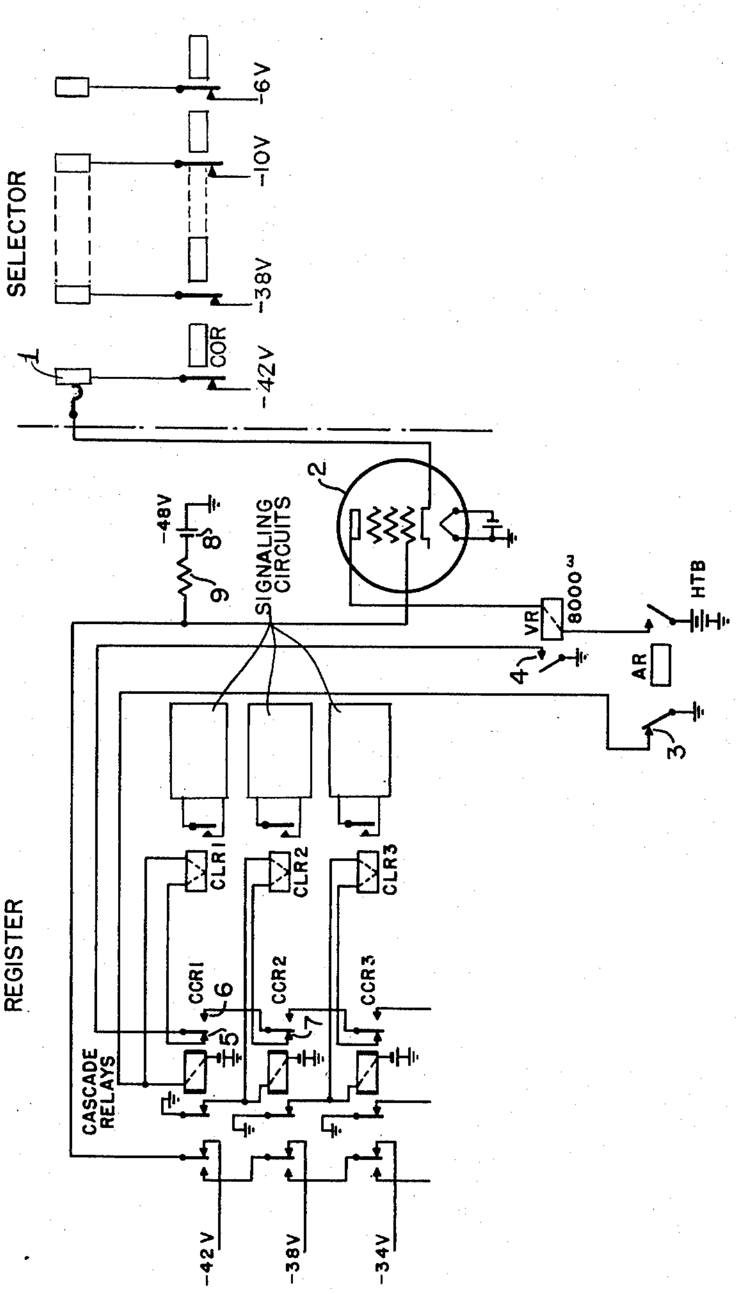
INVENTOR.
GERALD DEAKIN
BY
ATTORNEY Patented Oct. 9, 1951 2,570,214

UNITED STATES PATENT OFFICE 2,570,214

SECOND TEST CIRCUIT FOR SELECTOR WIPERS

Gerald Deakin, New York, N. Y., assignor to International Standard Electric Corporation, New York, N. Y., a corporation of Delaware Application September 14, 1946, Serial No. 697,145

7 Claims. (Cl. 179—18)

This invention relates to telecommunication control circuits. More particularly, it relates to electrical apparatus, connected between elements of a register and a test wiper of a selector, which is adapted to make a second test to ascertain if the selector has come to a stop with its test brush resting on the correct contact, and which is adapted to exercise one or more predetermined control functions if the selector has correctly stopped.

One of the functions of a register, i. e. a function performed by its fundamental circuits, is to control appropriate selectors so that each of them will pick a connection corresponding to a calling signal, or other signal, previously sent to the register. Certain fundamental circuits operate on the basis of comparing a succession of discrete voltages, which exist on the contacts wiped by the selector test brush, to a control voltage provided in the register and of responding in a predetermined manner when the wiper finds one of the discrete voltages which has the same magnitude and polarity as the control voltage.

In operation, the register may be adapted to respond to a call dialed by a subscriber by translating the call into a control potential and by switching its circuits to feed this potential to a comparing device. At the same time an appropriate selector is clutched into action and its test brush proceeds to wipe contacts having a plurality of discrete predetermined potentials impressed on them, and a switching action is performed whereby the selector test wiper feeds successively the potentials which it finds on the contacts of the selector to the comparing circuit.

The comparing circuit is adapted to perform certain switching operations when there is a coincidence between the two voltages fed to it, and one of these operations is to stop the movement of the selector.

According to some arrangements the operations of a comparing circuit include freeing portions of the register for other calls and causing the register to proceed to subsequent steps to complete the call undertaken. However, these operations should not take place unless the particular selection just completed was a correct one.

According to another arrangement, the freeing of certain portions of the register and/or the causing of the register to proceed to complete the call (after a given "test") are controlled by auxiliary apparatus and can only take place after that apparatus has made a "second test" and has found the selection to have been correct. Second testing has certain advantages, one of which is that the register will not undertake a subsequent test, in completing a call, until after two independent circuits have established that the preceding test, or tests, were correct.

It is an object of this invention to devise second testing apparatus adapted to perform a second test and to operate one or more control devices, such as relays, when, as a result of the second test, a first test made for a particular selector in response to control action by a register is proven to have been correct.

Other objects, features and advantages of this invention will be apparent from the following description of this invention and from the drawing, in which the single figure is a schematic diagram of a sufficient portion of the circuit of an embodiment of this invention to show how it operates.

The second test is made after the selector test wiper is at rest on a test contact (which has a predetermined voltage impressed upon it). As is shown in the drawing, the test wiper of a selector I rests against a test contact. Obviously, there will be a plurality of test contacts (as well as other contacts) in the selector, but the single one shown in the drawing represents the one on which the wiper rests at the end of the "first test" and is adequate to assist in the description of the circuit. Before the second test begins, a relay COR, which may be under control of other circuits of the register, has connected the contact on which the wiper has stopped to a source of potential. In certain embodiments, this connection may have been made before the first test. As is shown in the drawing, typical potentials connected to the test contacts might be a series of negative direct-current voltages separated by approximately four volts. It is within the scope of this invention to use any desired number of such discrete voltages and to separate them by any voltage difference which is convenient for the components and the design of a particular embodiment. However, in actual practice, the number may conveniently be limited to ten identifying potentials in many cases. This will permit the use of full four-volt steps from one potential to the next, without making unreasonable demands on voltage-supplying equipment ordinarily available. This arrangement may be the preferred one in many applications because there may be no need for more than ten different identifications, either at the calling line, at the trunk, or at the called line, and at each of these the same potentials may be used for different purposes.

The wiper of selector I is connected to the cathode of an electron discharge device, vacuum tube 2. During each second test, according to this invention, a downward stepping voltage is applied to the control grid of vacuum tube 2 by a stepping voltage circuit. This circuit includes, in a cascade arrangement, as many relays as there are separate test contacts in selector 1. The stepping circuit is connected to the control grid and is so arranged that, when the second test starts, it applies the most negative of a plurality of discrete negative potentials to the control grid, and immediately thereafter rapidly applies a succession of consecutively lower discrete negative potentials. The number of steps by which the cascade of relays can drop the voltage on the control grid is equal to the number of test contacts in selector 1. Each of the discrete negative potentials provided by the stepping circuit is respectively equal in magnitude to the potential on one of the contacts of selector 1. According to the operation of this device, if it should happen that, after the selector has made its selection, its wiper is at rest on a contact polarized with the most negative voltage of all the discrete voltages employed on the contacts of the selector, then the cascade, or stepping circuit, will be prevented from stepping down even one step in the progression which otherwise would occur. On the other hand, if the selector has come to rest on a contact polarized with the smallest of all the discrete negative potentials, the cascade will pass through the entire succession of consecutive downward steps and will only stop on reaching the smallest negative potential supplied by it.

Vacuum tube 2 may be energized by a high tension battery, such as HTB, shown in the drawing. At the start of the second test, a relay AR, which is controlled by some appropriate external means, is energized and its front contact connects the high tension battery HTB to the anode of vacuum tube 2. In series with this connection there is a relay VR which should be sensitive enough to be energized by the anode current of vacuum tube 2 when its control grid and cathode are at about the same potential level. Relay AR, at the same time that it acts to connect HTB to vacuum tube 2, opens its back contact 3 and starts the stepping-down process of the cascade relays. When it is closed, back contact 3 completes a circuit through the magnetizing coil of a first relay in the cascade, relay CCR1. This circuit, thus completed, includes a battery which supplies enough current to energize this relay and a conductive path through ground to which the circuit is connected at one terminal of the battery and the armature of relay AR which cooperates with contact 3. Thus, the movement of this armature can connect or disconnect contact 3 from ground respectively completing or opening the energizing circuit of relay CCR1.

When the second test starts, all relays in the cascade are energized (only three of them, CCR1, CCR2, CCR3, are shown in the drawing since this is adequate for the purpose of illustration). As explained above, the relay CCR1 will become de-energized when the back contact of relay AR opens. Since energization of relay CCR2 depends upon the front contact of relay CCR1, it also will become de-energized as a consequence of de-energization of CCR1. In the same way, relay CCR3 depends upon a front contact of relay CCR2 for its continued energization and will, therefore, release its armatures soon after CCR2 is released by the action of CCR1. Accordingly, when back contact 3 opens, relay CCR1 begins to release; when relay CCR1 has released up to a certain point, relay CCR2 will begin to release, and this process is carried step by step down the cascade of relays. However, these relays are sufficiently slow-acting so that it is possible for a different and quick-acting portion of this circuit, i. e. the portion attached to the anode circuit of vacuum tube 2, to intercede while any relay is in the process of releasing its armatures so as to prevent the completion of its de-energization (even though it has begun).

The control grid of vacuum tube 2, while relay CCR1 is energized, is connected by the circuits of the cascade relays to the largest negative potential in a cascade of negative potential steps that is used. A connection between the control grid and the source of this negative potential is completed by a front contact of relay CCR1. As soon as this relay releases, its armature, which will have been pressing on this front contact before the relay became de-energized, falls back against a back contact which is connected over to a corresponding armature of relay CCR2. This armature of relay CCR1 acts more quickly than its armature which controls the energizing circuit of relay CCR2 and, therefore, CCR2 will still be energized temporarily. Thus, the corresponding relatively fast armature of relay CCR2 will still press against its forward contact and complete a circuit to a source of the next lower negative potential. Since all of the cascade relays interact in this way, the potential on the control grid of vacuum tube 2 will be stepped down progressively as one after another of these relays releases. Since the largest negative potential is the one impressed upon the control grid at the start, and the lowest negative potential is the last one reached, and since the reductions are progressive, vacuum tube 2 will remain cut-off until the stepping voltage has dropped down to the negative potential level at which the grid is no lower than the cathode. Each of the discrete potentials applied to the contacts of selector 1 is equal to one of the negative voltage steps. The cascade will stop stepping down, therefore, when an effectively zero-bias condition is impressed on tube 2. The difference in magnitude between adjacent negative voltage steps exceeds the value of the cut-off bias of the tube selected for tube 2. Successive relays in the cascade become de-energized to the point where the next relay which would have been released connects to the control grid of tube 2 the same negative potential as the potential impressed on the contact selected by the wiper of selector 1. At that point any further advance in the stepping down is arrested. As soon as vacuum tube 2 draws current, relay VR presses its grounded armature against its front contact 4.

As was explained above, the energizing circuits of the relays in the cascade include their respective magnetizing coils, separate sources of electrical energy (batteries) for each relay, and current loops which include paths through ground, i. e. one side of each of the batteries is grounded while, respectively, a back contact of relay AR is grounded to complete the current loop for magnetizing relay CCR1, a front contact of relay CCR1 is grounded to magnetize relay CCR2, a corresponding front contact of relay CCR2 completes the loop for relay CCR3, etc. The successive releases of the relays, as was also explained, occur because the current loop of the relay CCR1 is first opened by the breaking of a connection to ground when relay AR is energized and because successive current loops are opened by successive openings of one of the ground connections of each. The switching action of relay VR, which occurs when vacuum tube 2 draws current, is to close an alternate path (shunt path) to ground to restore the energizing current loop of the particular relay that is in the process of slowly opening when tube 2 begins to draw current. In this way, it arrests the process of its releasing. The manner in which this action is made to occur is through a cascade arrangement which is plainly shown in the drawing and corresponds to the cascade arrangement which provides the stepping voltage. More specifically, a loop starting and ending with ground connections is completed through contact 4, front contact 5 of relay CCR1, the magnetizing coil of another relay (control relay CLR1 which is associated with relay CCR1), the magnetizing coil of CCR1, and through the same battery used to energize CCR1 when relay AR is de-energized. It is clear that if fast-operating relay VR should shut its contact 4 before slow-operating relay CCR1 can open its front contact 5, then the mere fact that AR has opened one current path through the magnetizing coil of this relay will not mean that the process of de-energization will become completed. A new current path will be available through the still closed contact 5 and the newly closed contact 4. The main difference will be that, through this new holding circuit of relay CCR1, the other relay associated with it, control relay CLR1, will now also be energized.

In view of what has been said above, it is clear that this will not occur unless the selector has picked a contact which is at the same voltage as the largest negative voltage provided by the stepping circuit, i. e. unless the condition exists in which not even one voltage step-down is needed and none will be permitted because of the action of the tube circuit. If any other condition exists, the slow-acting relay CCR1 will complete its release and the armature associated with front contact 5 will drop back against back contact 6. Back contact 6 is connected to an armature of relay CCR2 which presses against a front contact 7 when relay CCR2 is energized. This will transfer the ground connection made via contact 4 from front contact 5 of relay CCR1 to the corresponding front contact 7 of relay CCR2. Since relay CCR2 will now be in the process of slowly releasing, fast-acting relay VR will either operate to intercept this action, in a manner corresponding to that described above, or it will not operate because the cascade has not stepped down sufficiently to allow vacuum tube 2 to draw current. The cascade adapted to arrest the successive-releasings process is arranged so that step-downs will proceed and will be monitored until enough relays have released to lower the negative voltage on the control grid of vacuum tube 2 to the same potential as that on its cathode, i. e. the potential provided by the contact on which the test brush of selector 1 is resting.

Accordingly, when the second test is completed, the progressive stepping-down of negative voltage and the progressive releasing of relays (which constitute the action of the cascade) will stop, the next cascade relay which was due to have released will be held energized, and a control relay associated with it will have become energized.

This control relay can be adapted, according to conventional telecommunication practices, to signal other portions of the register that the second test has established that the selector stopped at the correct place, that some circuits of the register are free to proceed with the next operation in the same call, and, perhaps, that other circuits of the register are free to handle other business.

Vacuum tube 2, after a normal second test, will continue to draw current and relay AR will continue to be energized, until some external control is exercised whereby the second test apparatus is restored to its ready state and tube 2 is again cut off.

For example, an external control may de-energize relay AR. The direct effects will be to remove the energizing potential from vacuum tube 2 and to close back contact 3. When back contact 3 is closed, relay CCR1 will be energized and this relay will shut its front contact which completes the energizing current loop of relay CCR2. Progressively the entire cascade of relays will be re-energized, and the circuit will be made ready for the next second test.

Vacuum tube 2 is shown in the drawing herein as having a plurality of electrodes including a screen grid and a suppressor grid. The connections of these electrodes are not shown, since whenever this type of tube happens to be selected for particular embodiments of this invention, these connections may be made in accordance with usual practice. It is not essential, however, that this tube be a pentode, nor is it essential that it be a high vacuum tube. Instead, vacuum tube 2 may be a simple triode, a gas discharge tube, or almost any electron discharge device which has a control grid. However, consideration must be given to the type of tube used, so that the resistance of the magnetizing coil of relay VR and its sensitivity may be selected to be appropriate to the tube. This selection can be made by ordinary well known standards.

It is evident that, according to the arrangement for stepping down the negative biasing voltage, there will be short periods of time during which certain armatures of the cascade relays will be swinging from their respective front contacts to their respective back contacts, and that, for these intervals of time, they will not be in contact with either. During these intervals there would be no negative voltage from the stepping circuit impressed on the control grid of vacuum tube 2 and, therefore, it would be free to draw current. This condition is undesirable as it might permit spurious operation of relay VR. To prevent this, an auxiliary negative voltage source is employed. This is shown in the drawing by battery 8. Battery 8 is connected to the control grid of tube 2 and provides a negative bias at least as great as the largest negative voltage supplied by the stepping circuit (a negative voltage which is large enough to keep vacuum tube 2 cut off, irrespective of which test contact has been selected by the test brush of selector 1). In order that this battery will not place a cut-off potential on the control grid of tube 2 irrespective of the stepping action of the cascade, a dropping resistor 9 is connected in series with battery 8 and each of two circuits, one going to the control grid of vacuum tube 2, and one going to the cascade relays. Accordingly, when the cascade connects a certain potential to the control grid of vacuum tube 3, the circuit providing that voltage will also provide a current path including resistor 9 and battery 8 in series. The highest impedance in this current path will preferably be that of dropping resistor 9 so that the voltage drop across it will reduce the fixed voltage provided at the control grid by battery 8 to the same value as that being provided by the stepping circuit. In other words the fixed voltage source including battery 8 has a high output impedance.

What I claim is:

1. A telecommunication circuit for making a second test of a connection already made by a test wiper of a selector to one of the selector test contacts comprising voltage means for applying discrete voltages to the test contacts of said selector, a voltage comparing means having two input circuits and an output circuit which becomes energized when the voltages applied to the input circuits bear a predetermined relation, means for connecting one of said input circuits to said test wiper, means for applying a rapid succession of discrete voltages to the other input circuit, and means coupled with the output circuit of said comparing means for signalling which of the discrete voltages has caused the energization thereof.

2. A telecommunication circuit, according to claim 1 in which the discrete voltages are negative voltages and those voltages applied successively to the input of the comparing means are progressively of smaller negative amplitude, and in which the comparing means is a multi-electrode discharge device having an anode, a cathode, and a control grid, the input circuit connected to the test wiper of the selector being connected to the cathode of said device, the other input circuit being connected to the control grid and the output circuit being connected to the anode, the circuits of said device being adjusted to draw anode current when the control grid is at a potential substantially no more negative than the potential of the cathode.

3. A telecommunication circuit, according to claim 2, in which an additional negative potential larger in value than the largest of the discrete potentials is connected to the control grid of the discharge device through a high impedance.

4. A telecommunication circuit, according to claim 1, in which the means for applying a rapid succession of discrete voltages to the comparing means is a stepping voltage circuit, and in which means is provided for starting the operation of said stepping voltage circuit, and the means for signalling which of the discrete voltages has caused the energization of the comparing means comprises a plurality of control means, one associated with each potential produced by said stepping voltage circuit, and means coupled to the output circuit of said comparing means and controlled jointly by said comparing means and said voltage stepping circuit for operating the control means associated with the stepping voltage which operates said comparing means.

5. A telecommunication circuit according to claim 4, in which the stepping voltage circuit comprises a plurality of relays arranged in cascade, and the starting means operates a first relay in the cascade, each relay having contacts controlling the operation of a subsequent relay and additional chain contacts for connecting a discrete voltage to the comparing means, and in which the means for signalling which discrete voltage has operated the comparing means comprises a plurality of control relays one connected with each cascade relay and current operated switching means under control of said comparing means for operating a control relay connected with a cascade relay whose additional contacts have connected the particular discrete voltage to said comparing means which has operated said comparing means.

6. A telecommunication circuit, according to claim 5, in which the cascade relays are slower operating than the current operated switching means.

7. A telecommunication circuit, according to claim 6 in which the discrete voltages are negative voltages and those applied successively to one input of the comparing means are progressively of smaller negative amplitude, and the comparing means is a multi-electrode discharge device having an anode, a cathode, and a control grid, the input circuit connected to the test wiper of the selector being connected to the cathode, the other input circuit being connected to the control grid and the output circuit being connected to the anode, the circuits of said device being adjusted to draw anode current when the control grid is at a potential substantially no more negative than the potential on the cathode.

GERALD DEAKIN.

REFERENCES CITED

The following references are of record in the file of this patent:

UNITED STATES PATENTS

| Number | Name | Date |
|---|---|---|
| 2,237,413 | Clark | Apr. 8, 1941 |
| 2,238,223 | Kogma | Apr. 15, 1941 |
| 2,351,016 | Deakin | June 13, 1944 |
| 2,354,682 | Herbig | Aug. 1, 1944 |
| 2,380,950 | Deakin | Aug. 7, 1945 |
| 2,419,540 | Deakin | Apr. 29, 1947 |
| 2,428,024 | Herbig | Sept. 30, 1947 |